Dec. 3, 1940.  W. TÖGEL  2,224,068

ARTICULATED DRIVING BELT OR CHAIN FOR USE WITH V-GROOVE PULLEYS

Filed May 13, 1938

Inventor,
Walter Tögel,
Frank S. Appleman
attorney

Patented Dec. 3, 1940

2,224,068

UNITED STATES PATENT OFFICE 2,224,068

ARTICULATED DRIVING BELT OR CHAIN FOR USE WITH V-GROOVE PULLEYS

Walter Tögel, Cologne, Germany, assignor to Koeln Factory of Wilhelm Quester, Cologne-Suelz, Germany Application May 13, 1938, Serial No. 207,805
In Germany November 12, 1936

11 Claims. (Cl. 74—236)

This invention relates to articulated driving belts or chains, such as are used as the power transmission means in certain types of infinitely variable change speed gears employing V-groove pulleys. The invention refers more particularly to those belts or chains comprising parallel plates on opposite sides of the belt or chain, on whose outer surfaces wedge shaped friction layers are mounted.

It is already known to build up the friction layers from a number of separate pieces of material of wedge cross section corresponding to the individual plates along the side edges of the belt or chain, to which they are attached in such manner as to produce an articulated driving belt of wedge cross section, which when engaged in a corresponding wedge shaped groove in a wheel or pulley can transmit power.

Also articulated chains are known whose side surfaces are shaped correspondingly to the wedge shaped groove of the chain wheel or pulley. These articulated belts and chains of wedge cross section have however, only run smoothly if the greatest care is taken in manufacture, as to the shape both of the flanks or side edges of the belt or chain and of the pulley or wheel groove. The known articulated chains with wedge shaped friction layers have a sufficient transverse stiffness, but there is the disadvantage that the separate friction layer members or friction blocks must necessarily take up a polygon-like formation as the chain or belt passes round the pulleys or wheels, so that relative movement between the wheel and the layers must take place which leads to increased wear. A further disadvantage is that the replacement of the individual portions of the friction layer is somewhat complicated and accordingly inaccuracy in positioning the flanks can arise if special care is not exercised. In one known construction a thin friction layer strip is provided below the articulated chain, to which the friction blocks proper are fastened. This layer running below the articulated chain is fixed along the whole length of each chain link and therefore runs similarly to the links of the chain when bent polygonally round a pulley or wheel. The purpose of this arrangement is to strengthen the driving member and to prevent the penetration of dirt and sand.

For the purpose of avoiding these disadvantages according to the invention, on both sides of an articlated chain or the like are arranged friction layers shaped to conform to the wedge shape of the pulley or wheel groove which are mounted continuously as endless bands on plates carried by the flanks or side edges of the chain. Such a driving belt or chain has the advantage of possessing considerable stiffness in the transverse direction, and also reduces wear of the friction layers. Also the driving belt or chain does not form a polygon round the pulleys or wheels over which it runs, since the layers can conform exactly to the shape of a pulley or wheel in passing round it.

Replacement of the friction layers can very easily be effected, if they are arranged to be removably gripped by the plates along the sides of the chain or belt, on which they are mounted.

The invention is illustrated by way of example in the accompanying drawing, in which.

Figure 3:
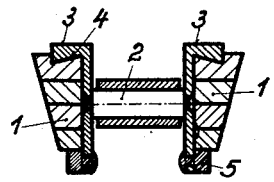
Figures 3 and 4 are cross sections through the belt or chain, showing two different methods for fastening the friction layers in position on the side plates of the belt or chain.

Referring to the drawing, I indicates the friction layers consisting of rubbber, leather or other suitable material arranged on the two sides of the articulated chain 2. 3 are the side or flank plates, on which the friction layers I are mounted. 6 are the chain links, 7 the belts, by which the links and plates are connected together.

Figure 4:
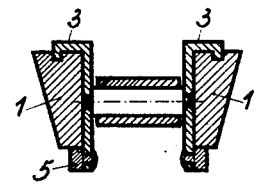
Figure 1:
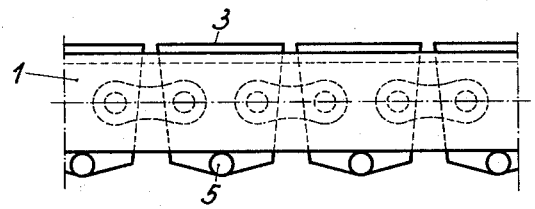
Figure 1 shows a driving belt or chain according to the invention in extended form.
Figure 2:
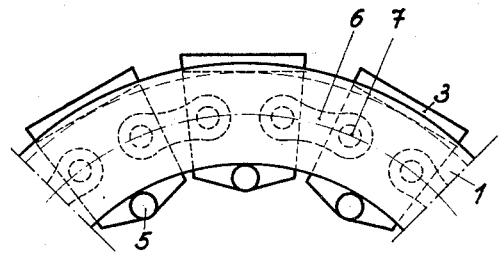
Figure 2 shows the belt or chain engaged over a roller.

In Figure 4 the upper portion of the plates are shown bent over into channel shape so as to grip the friction layers I therein. The attachment of the friction layers according to Figure 3 is affected by an undercut or wedging surface 4. The layers are supported in position on the chain by means of bolts or rivets 5 in such manner that exceptional flexibility of the layer is ensured.

Figure 5:
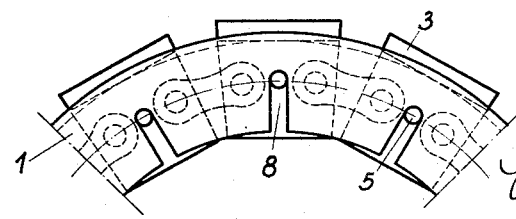
Figure 5 shows a driving belt or chain according to the invention in which, in order to increase its flexibility, the friction layers have portions cut out therefrom in known manner.

The constructional example shown in Figure 5 is especially suitable for those belts or chains which have to run over wheels of small diameter. In this construction slots 3 are provided in the inner edges of the layers I which extend to the neutral plate of the belt or chain. At the bottom of these slots engage the bolts 5 on the plates.

The invention is not limited to the constructions shown in the drawing, but includes all arrangements which serve to increase the transverse stiffness of covering layers extending endlessly along the chain. The material of the friction layers can consist of leather, rubber or the like material, which has a specially high resistance to wear, as "Turia", or the like. Also in the example shown in Figure 5 the friction layers may have slots on both edges.

I claim:

1. A wedge shaped driving belt member having a plurality of separate attachment plates mounted along its edges, flanges along the outer edges of said plates, laterally projecting supporting pins on said plates adjacent to their inner edges, said pins having a cross section providing an arcuate supporting surface, and a pair of continuous friction bands of wedge cross section held along said edges between said flanges and said arcuate surface of said supporting pins.

2. A wedge shaped articulated driving member having a plurality of separate attachment plates mounted along its edges, flanges along the outer edges of said plates, laterally projecting supporting pins on said plates adjacent to their inner edges, said pins having a cross section providing an arcuate supporting surface, and a pair of continuous friction bands of wedge cross section held along said edges between said flanges and said arcuate surface of said supporting pins.

3. A wedge shaped driving belt member comprising an endless chain, a plurality of attachment members along the edges of said chain, flanges along the outer edges of said attachment members, supporting pins on said attachment members adjacent to their inner edges, said pins having a cross section providing an arcuate supporting surface, and a pair of continuous friction bands of wedge cross section held along said edges between said flanges and said arcuate surface of said supporting pins.

4. An articulated driving member comprising a plurality of pairs of oppositely disposed attachment plates, flanges along the outer edges of said plates, laterally projecting supporting pins on said plates adjacent to their inner edges, said pins having a cross section providing an arcuate supporting surface, roller member connecting the opposite plates of each pair together, links intermediate between plates of adjacent pairs and connecting them together to form an endless chain like member, and a pair of continuous friction bands held along the edges of said member between said flanges and said arcuate surface of said supporting pins.

5. A driving belt member having a plurality of separate attachment plates mounted along its edges, flanges along the outer edges of said plates, laterally projecting supporting pins on said plates inwardly of said flanges, said pins having a cross section providing an arcuate supporting surface, and a pair of continuous friction bands supported on said plates by and between said flanges and said arcuate surface of said pins.

6. An articulated driving member having a plurality of separate attachment plates mounted along its edges, flanges along the outer edges of said plates, laterally projecting supporting pins on said plates inwardly of said flanges, said pins having a cross section having an arcuate supporting surface, and a pair of continuous friction bands supported on said plates by and between said flanges and said arcuate surface of said pins.

7. A driving belt member comprising an endless chain, a plurality of separate attachment plates mounted along its edges, flanges along the outer edges of said plates, laterally projecting supporting pins on said plates inwardly of said flanges, said pins having a cross section providing an arcuate supporting surface, and a pair of continuous friction bands supported on said plates by and between said flanges and said arcuate surface of said pins.

8. An wedge-shaped driving belt member having a plurality of separate attachment plates mounted along its edges, flanges along the outer edges of said plates, laterally projecting supporting pins on said plates inwardly of said flanges, said pins having a cross section providing an arcuate supporting surface, and a pair of continuous friction bands of wedge-shaped cross section supported on said plates by and between said flanges and said arcuate surface of said pins.

9. A wedge-shaped articulated driving member having a plurality of separate attachment plates mounted along its edges, flanges along the outer edges of said plates, laterally projecting supporting pins on said plates inwardly of said flanges, said pins having a cross section providing an arcuate supporting surface, and a pair of continuous friction bands of wedge-shaped cross section supported on said plates by and between said flanges and said arcuate surface of said pins.

10. A wedge-shaped driving belt member comprising an endless chain, a plurality of separate attachment plates mounted along its edges, flanges along the outer edges of said plates, laterally projecting supporting pins on said plates inwardly of said flanges, said pins having a cross section providing an arcuate supporting surface, and a pair of continuous friction bands of wedge-shaped cross section supported on said plates by and between said flanges and said arcuate surface of said pins.

11. An articulated driving member comprising a plurality of oppositely disposed attachment plates, flanges along the outer edges of said plates, laterally projecting supporting pins on said plates inwardly of said flanges, said pins having a cross section providing an arcuate supporting surface, roller members connecting the opposite plates of each pair together, links intermediate each pair of said plates and connecting said pairs together to form an endless chain-like member, and a pair of continuous friction bands supported on said plates by and between said flanges and said arcuate surface of said pins.

WALTER TÖGEL.